June 1, 1943.  G. H. WAKEFIELD  2,320,391
EXPLOSION TURBINE MOTOR
Filed Sept. 6, 1938  4 Sheets-Sheet 3

INVENTOR.
GEORGE H. WAKEFIELD
BY
*John J. Bruy*
ATTORNEY.

June 1, 1943.  G. H. WAKEFIELD  2,320,391
EXPLOSION TURBINE MOTOR
Filed Sept. 6, 1938   4 Sheets-Sheet 4

INVENTOR.
GEORGE H. WAKEFIELD
BY
ATTORNEY.

Patented June 1, 1943

2,320,391

UNITED STATES PATENT OFFICE 2,320,391

EXPLOSION TURBINE MOTOR

George H. Wakefield, Takoma Park, Md.

Application September 6, 1938, Serial No. 228,667

30 Claims. (Cl. 60—49)

My invention relates to improvements in explosion turbine power plants, stationary or non-stationary.

An object of the invention is to arrange and construct such power plants that a greater efficiency and economy in operation and a substantially prolonged life thereof is secured.

Another object of the invention is to provide means for effectively cooling turbine blading, which is exposed to very high temperatures, without appreciably reducing the temperature, the pressure, the velocity, and the power of the combustion products.

In the operation of intermittent explosion type turbines, it is essential that certain fundamental difficulties be overcome before a turbine of this type will prove its superior efficiency and economy over the present highly developed internal combustion engine. The first of these difficulties arises from the fact that the temperature of the turbine blading must be kept within a safe range so as to not burn the blades. At the same time, the temperature and pressure of the combustion products should be high in order to secure the desired economical operation of the turbine.

Many devices and arrangements have been proposed to overcome these difficulties, most of which having been proved to be only wasters of heat and power. Early proposals involved the introduction of water or an excess of air into the combustion products in the belief that the temperature thereof would be sufficiently lowered and thus prevent any burning of the blading. These proposals were also based upon the belief that the loss in power, due to the addition of water, would be offset by power derived from the steam generated. This, however, has not proven to be true. A later development, of spraying water into the nozzle passages, during cylinder scavenging, has had the disadvantages of prolonging the cycle, placing added drag on the blading thereby causing an appreciable cooling of the succeeding hot charge, and involving a multiplied complicated and costly water-valve injector system.

I overcome these difficulties and disadvantages, first, by preferably using opposite directional rotating turbine blades, with alternate layers revolving in opposite directions. Second, I introduce the cooling media, preferably water, into the path of the blades, preferably at one point remote from the main power nozzles. In this way, every blade must pass through the cooling zone and be cooled. The combustion products move through the blading in more or less straight lines and are very little, if at all, effected by the cooling media which also moves through the blading in a like manner; the power nozzles and the cooling jet being separate and distinct one from the other.

By this means, the hot gases of combustion are expanded through the blading without coming into contact with the cooling media to any appreciable degree and, if combustion gases are, to begin with, high in temperature even to the point of dis-association, they will impart the greatest amount of power possible. While the blading should remain about as hot as safety permits, excess heat imparted to it is quickly picked up by the water, in the form of fine mist or steam, which is injected from a suitable nozzle at a speed akin to that of the combustion products from the power nozzles; the water, being transformed into super-heated steam on contact with the hot blading and already having a high velocity, acts as a source of high pressure steam power and, consequently, as an additional aid to the turbine. This is especially so where a booster gas or gases is employed to accelerate the speed of the water spray.

With the foregoing advantages and objects, and others of equal importance, in view, the invention resides in the certain new and useful arrangement, combination and construction of parts, as will be hereafter more fully described, set forth in the appended claims, and illustrated in the accompanying drawings, in which:

Referring to the accompanying drawings, wherein like characters of reference designate corresponding parts throughout the several views, the constant volume combustion chambers 20 are to be charged in any suitable manner with fuel and compressed air, and the chamber intake-valve assemblies 18, 18', the power nozzles 63, 68, and the power nozzle valves 71 are arranged to deliver hot exploded charges from the combustion chambers 20 into the turbine. The timing, the ignition, the charging, and the charge control valve operating means may be any that is common to the art and suitable for the purpose. As the hot high pressure intermittent charges enter the turbine, they come into contact with the turbine blade sets 21, 22, the blade set 21 being rotatable in the opposite direction from that of the blade set 22. The blades 21 carried on a spindle 23 are bevelled opposite to the blades 22 carried on spindle 24. The spindles 23 and 24 are mounted securely on separate shafts 25 and 26, shaft 26 being solid and shaft 25 hollow to fit over shaft 26. The shafts 25 and 26 are free to revolve in opposite directions in suitable bearings 27 and relatively to the turbine housing 28, 29, in suitable bearings 30, 31. The shafts 25 and 26 are carefully adjusted for radial and axial clearances by suitable thrust bearings and adjustments (not shown) common to the art. Gas leaks are kept to the minimum by suitable labyrinth packings 32, 33, space being saved by putting the packing 32 over the exhaust flange 34 and the packing 33 over the bearing 31. Provision is made for escaping gases to pass out of ports 35 and not through bearing 31. The spindle 24 is formed with port openings 36 about its center for spent gases to escape into the exhaust pipe 37 through the exhaust flange 34.

A gear housing 38 is provided to enclose suitable reversing gears for the shafts 25 and 26 and it may be supported separate from or secured to the turbine housing 28 by any suitable means, such as bolts passed through flanges 46, 46'. Gear 39, which is secured to the outer turbine shaft 25, transfers motion to bevelled pinions 40 running loose on suitable spindles 41. Gear 42 is secured to the inner turbine shaft 26 and is meshed with the pinions 40 for rotation in the direction opposite to that of gear 39. A shaft 43 driven by one of the pinions 40 is available to operate any suitable ignition system, governor, or other part of the turbine. A gear 44 is disposed in mesh with a second set of bevelled pinions 40 within the housing 38 and like gear 39, reverses the direction of rotation of another outer shaft 45 from that of shaft 26 and it may be used to operate another similar turbine or other machinery in conjunction with shaft 26'. The gearing and all bearings within the housing 38 may be packed with grease or oiled by any suitable lubricating system common to the art.

Figures 1, 6:
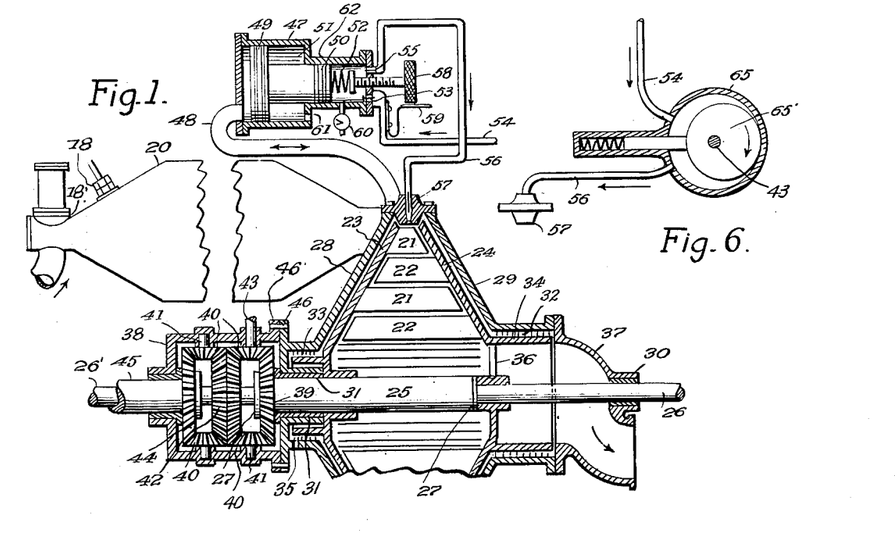
Figure 1 is a fragmentary side elevation, partly in section, of my improved turbine and pump assembly and showing one means of cooling the turbine blading.
Figure 6 is a vertical transverse section through a form of eccentric pump and showing its manner of application to the turbine in Figure 1.
Figure 2:
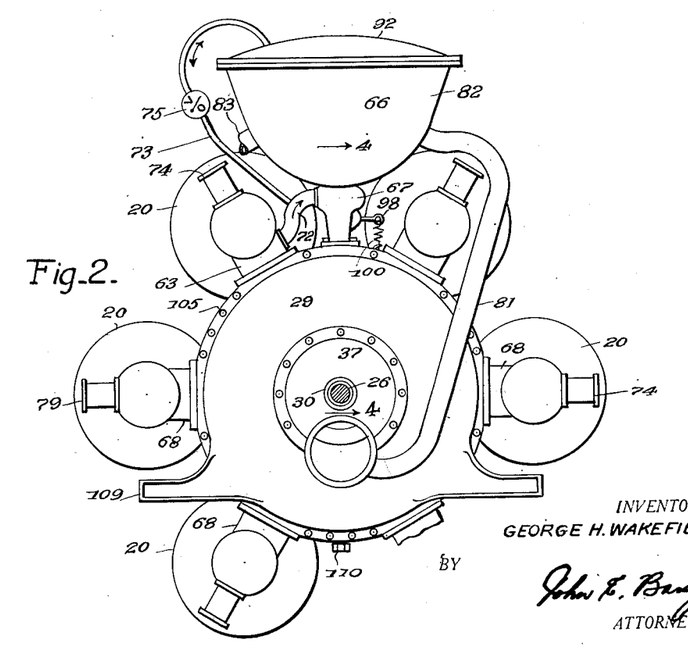
Figure 2 is a fragmentary end elevation of the turbine and showing a modified form of cooling means in assembly therewith.

As the power charges pass from the combustion chambers 20 into the turbine, a portion of a charge is taken from one, or more than one, of the power nozzles 63 to operate a cooling liquid injection pump 47 (Figure 1), a power nozzle 63 being ported as at 64 (Figure 3) for the purpose. As shown in Figure 1, this charge is conducted by pipe 48 to the pump 47. Due to the pulsating action of the exposion charges of the power nozzles 63, the piston 49 is moved to the right in cylinder 51 when the gas pressure is high and is forced to the left when the gas pressure is low by the action of a spring 52 against piston 50. Pistons 49, 50, are made to operate as a unit. The amount of cooling liquid injected is proportionate to the work of the turbine rather than to its speed. This is true because the work exerted on piston 49 by the combustion gases varies directly in proportion with the work exerted by the same gases on the turbine blading 21, 22.

As the pistons 49, 50, move to the left by action of spring 52, Fig. 1, water is admitted or drawn into the cylinder 62 through check valve 53 from pipe 54 leading from a water source (not shown), the check valve 55 being closed. As the pistons 49, 50, are forced to the right proportionately to the pressure of the charge in the power nozzle 63, check valve 53 closes and the cooling water is forced out past check valve 55 through pipe 56 to a cooling jet 57 where it is sprayed as a fine mist into the moving blading 21, 22. The jet 57 may take many forms common to the art. It is desirable, however, that the cooling water be broken up sufficiently fine for good distribution through the blading 21, 22, as they pass through the cooling zone under the cooling jet 57. The jet 57 is secured to the turbine housing 28, 29, in much the same way as are the power nozzles 63, 68, but separate and apart from them. The jet 57 and the power nozzles 63, 68, each occupy a different place on the periphery of the turbine housing.

An adjusting screw 58, retarded by friction spring 59, is provided for regulating the tension on spring 52 which, in turn, regulates the amount of cooling liquid injected. The amount of the cooling liquid, as well as its pressure of injection, is also dependent on the ratio of the area which the driving piston 49 bears to the area of the driven piston 50, the size of the pipes 54, 56, ports, check-valves 53, 55, area of the cooling jet opening 57 and of the passages in the gas operating side of the pump 47, and it is to be here noted that the greater the force of injection of the water spray from jet 57, the less will be the drag on the turbine blading 21, 22; also, the greater will be its power producing factor, especially when the water is hot and much or all of it is transformed into superheated steam upon contact with the blading. It is obvious that due to the differential areas of the two pistons the water pressure in cylinder 62 will be much greater than the gas pressure in cylinder 51. The cylinder 51 is provided with a vent port 61 for bleeding air from behind the piston 49.

In Figure 6, an eccentric pump 65 is shown connected to the liquid supply pipe 54 to force the liquid through pipe 56 and from the spray jet 57. This pump will have the shaft 43 of its rotor 65 geared' to the turbine, as shown in Fig. 1 or otherwise driven therefrom, thereby causing the turbine blading 21, 22, to be cooled by the water spray proportionately to the speed of the turbine and not proportionately to its load. This type of pump, or any other that is found to be suitable, whether rotary, piston, turbine, or centrifugal, operating either singly or compoundly, may be interchanged with the gas pump 47 (Figure 1), and they may be arranged to furnish intermittent or continual cooling of the blading 21, 22, and to effect proper cooling either proportionately to the power load of the turbine or to its speed, or both.

In Figures 2 to 4 and 7 to 10, both inclusive, a modified form of cooling system is depicted and, although presenting a somewhat radical departure in structure and operation, it is in reality but another form of automatic pump, with certain added functions. Here, a tank 66, to receive a cooling liquid that is principally water, is secured on or near the turbine, preferably between the power nozzles 63, 68, but removed from them by the interposed cooling jet nozzle 67. The nozzles supplying the combustion products from the combustion chambers 20 direct to the turbine blading 21, 22, are referred to as "power nozzles" 68 and the nozzle, or nozzles as the case may be, tapped by port 64 (Figure 3) as "master power nozzle" 63; one such master power nozzle being usually sufficient. In the simplest form of the cooling means, as in Figure 1, the water spraying terminus has been referred to as a cooling jet 57. Where the cooling jet 57 is assisted by gas pressure in the forceful injection of the cooling liquid, the chamber formed about the jet 57 is hereinafter referred to as the cooling jet nozzle 67.

The tank 66 may function on low pressures, but I prefer to operate it on the high pressures of a combustion chamber 20. When the master power nozzle valve 71 is open, it being controlled by a means 74 common to the art, the hot gases in making way into the turbine blading 21, 22, exert considerable pressure on the port 64 and in pipes 72, 73, which carry a portion of the gases into the cooling jet nozzle 67 (pipe 72) and into the top of the tank 66 (pipe 73). The pipe 73 delivers its portion of the gases into the tank 66 through a slow leak-return check valve 75. The introduction of gases to the top of the tank 66 exerts considerable pressure on the liquid therein, while the check valve 75 prevents the gases from returning to the master power nozzle 63 and only allows them to leak off slowly after the turbine is stopped. The valve flap 89 (Figure 7) is provided with a leak port 90 which, during the operation of the valve, is brought into engagement with a cleaning pin 91 projecting inwardly from the body. By this means the leak-port is kept clean automatically throughout its operation.

Figures 3, 7, 8:
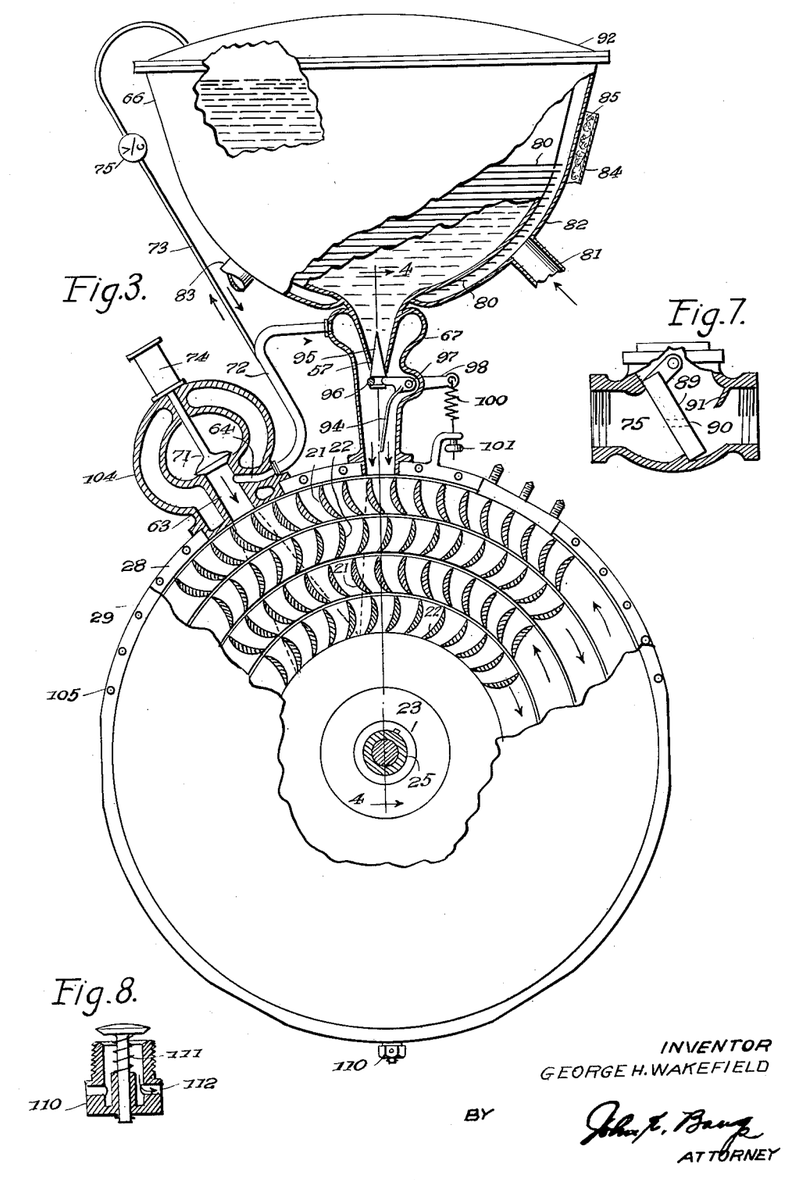
Figure 3 is an enlargement of Figure 2 but with portions thereof broken away to show features of the interior construction.
Figure 7 is a vertical longitudinal section through a form of self-cleaning, slow leak-return, check-valve as used in the assemblies of Figures 2, 3, and 5.
Figure 8 is vertical section through an automatic drain check-valve for use at the bottom of the turbine.

The tank 66 is filled with water or other suitable cooling liquid. The top of the tank 66 is preferably in the form of a removable cover or lid 92, while the side walls thereof may be so sloped as to prevent damage to the tank in the event of freezing of the cooling liquid therein, as will be well understood. The outside of the tank 66 is preferably provided with fins 80 for the radiation of heat therefrom to the tank; the heat being imparted to the fins by the turbine exhaust gases which are conveyed by a pipe 81 to a jacket 82 surrounding the tank. These exhaust gases pass from the jacketed space about the tank out through a pipe 83 (Figure 3). The tank 66 may be further jacketed, as at 84, with the space between the latter and the jacket 82, filled with a heat insulating material 85, in order that the cooling liquid or water within the tank will be kept near a boiling temperature, or a temperature proportionate to its given working pressure. The size of the pipe 81 may be relied upon to regulate the heat imparted to the tank 66. The lower end of the tank 66 may be extended to form the cooling jet 57' and provided with a removable valve seat 93, as shown in Figure 5. The cooling jet nozzle 67 (Figures 3, 4, and 5) may or may not be made as a unit with the tank 66.

As the turbine commences to run, the pressure in the tank 66 is quickly built up; a portion of the combustion gases shooting through port 64, pipe 72 and cooling jet nozzle 67 each time a charge is delivered through the master power nozzle 63 from its combustion chamber 20. In passing through the cooling jet nozzle 67 (Figures 3 and 4), the gases strike a pivoted depending flapper 94 within the cooling jet nozzle 67 and force it into a more or less horizontally straightened position in relation to the direction of gas flow. This movement of the flapper 94 is proportionate to the magnitude of gas pulsations in the cooling jet nozzle 67, which pulsations are also proportionate to the load on the turbine because the magnitude of these gas pulsations varies in direct proportion to the pressure in the power nozzles 63, 68, it being understood that the air and fuel charges delivered to the combustion chambers 20 are in like manner varied with the load. Likewise is the pressure in tank 66 varied. This flapper 94 has a rigid arm 96 connecting it to a shaft 97 which is journalled in suitable bearings in the walls of the cooling jet nozzle 67 and, when actuated, acts to open the cooling jet valve 95 proportionately to the turbine load and the latter, in turn, acts to admit an amount of cooling liquid from the tank also in proportion to the load. A packing nut 99 and a suitable packing (not shown) are provided to prevent escape of gas from the cooling jet nozzle 67 where the shaft 97 emerges from it. A spring 100 and a wing nut 101 provide the necessary adjustment for this automatic cooling jet nozzle assembly. The valve 95 (Figures 9 and 10) is secured on an arm 96, forming a part of the flapper 94, by means of a lock screw 103, which also holds valve part 102 in place.

Figure 4:
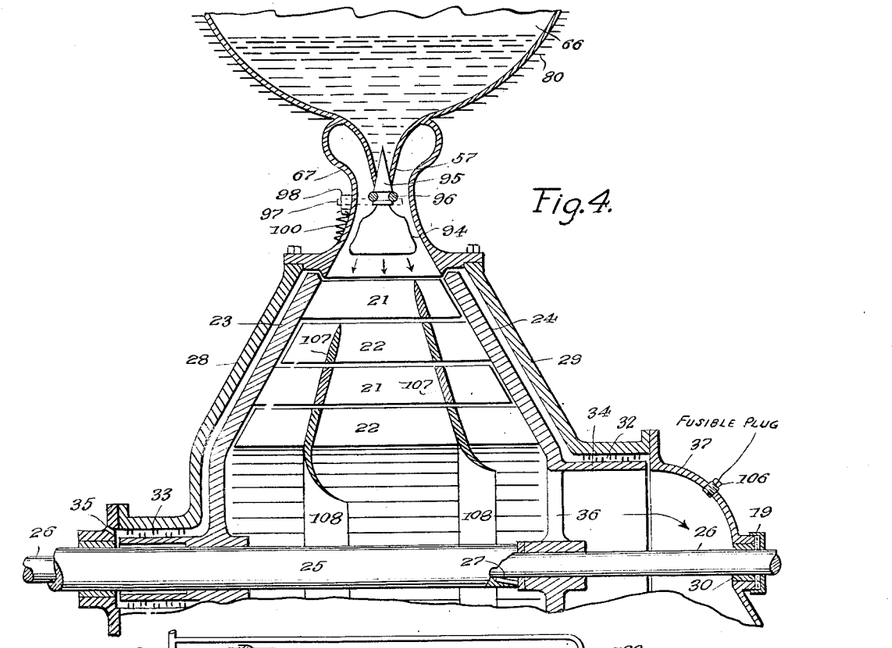
Figure 4 is a fragmentary longitudinal section taken on line 4—4 of Figure 3.
Figure 5:
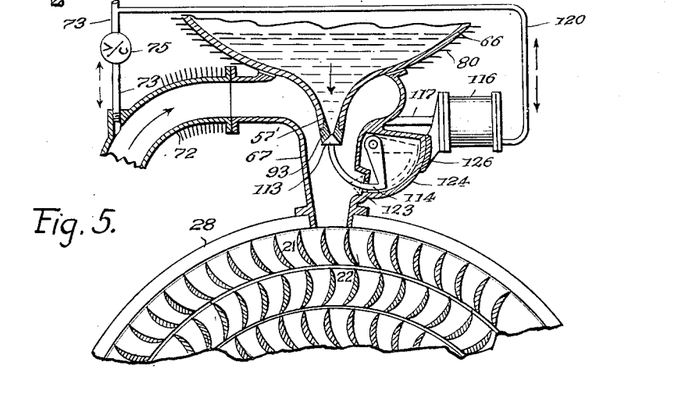
Figure 5 is a fragmentary transverse section similar to Figure 3 but showing yet another modified form of the cooling means.
Figure 9:
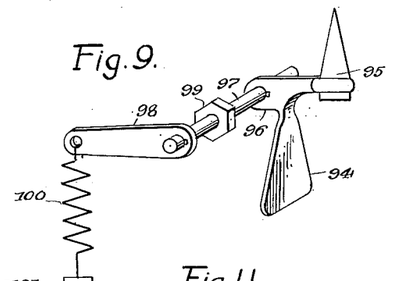
Figure 9 is a perspective view of the cooling jet valve and its actuating means, as used in connection with the cooling means of Figures 2, 3, and 4.
Figure 10:
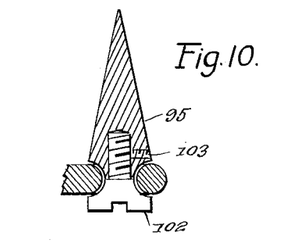
Figure 10 is a detail sectional view of the cooling jet valve of Figure 9.

The water spray will reach both ends of the turbine blades 21, 22, by reason of the shape of the cooling jet nozzle 67, Fig. 4, which expands the gases in proper manner along the axis of the blades as well as through the blade assemblies. This aids in keeping the cooling media separate from the power gases as they both pass radially and side by side through the turbine. The power nozzles 63, 68, likewise may be of this flattened form to correspondingly shape the injected stream of combustion gases and thus eliminate need for ordinary gas-directing bridges that are commonly employed and which easily overheat and cause added friction and trouble. The water spray, with a portion of the combustion gases, passes into the turbine blading with a speed akin to that of the combustion gases in the power nozzles 63, 68; the water particles, on contact with the hot blading, are transformed into steam and, with its given speed and momentum, causes the action of the cooling jet nozzle 67 to appreciably aid in the operation of the turbine, while, at the same time, performing the important function of cooling the blading without interference from or with the action of the power charges from the other of the combustion chambers 20.

I am aware that, by mixing water with a portion of the power gases, a loss of power is incurred and this is true if any considerable amount of the combustion gases are utilized in force feeding the cooling liquid in the stated manner. However, the cooling jet nozzle 67 is preferably made quite small in comparison to the size of the power nozzles 63, 68, in order to minimize such loss and it is probable that the power generated as steam by the vaporization of the cooling media will offset this loss. In any case, the amount of combustion gases so employed need not be such as to greatly impair the efficiency of the power plant.

The turbine housing sections 28, 29, are secured together in any suitable manner, for instance, by bolts 105. The pipe 72, if need be, may be finned, as shown in Fig. 5 or cooled in any usual manner. Also, the combustion chambers 20 and the power nozzle valves 71 may be cooled in any suitable manner, as by means of a water jacket 104, Figure 3. A fusible plug 106, Figure 4, is provided to blow out on overheating of the turbine and to give indication that the cooling tank 66 is empty or the system is in need of repair. Suitable lacings or rings 107 may be secured to the blade sets 21, 22, in any suitable manner to lend strength thereto and to allay vibration and their inner ends 108 are preferably shaped to aid in directing the exhaust gases from the turbine housing. A packing gland 19, Figure 4, is provided to prevent exhaust gases from entering the bearing 30.

The turbine assembly may be supported in operative position by means of brackets or the like 109. A check valve 110, Figures 3 and 8, is provided in the bottom of the turbine housing for draining purposes should there be a water leak into it in cold weather. This valve is made with a slight tendency to open when the turbine is not running and to close when it is in operation, since any slight gas pressure in the housing 28, 29, causes it to close, while a spring 111 forces it open when the pressure is relieved upon stoppage of the turbine. The drain ports 112 in the casing of the valve 110 should be sufficiently large to remain clean.

Figures 11, 12, 13, 14:
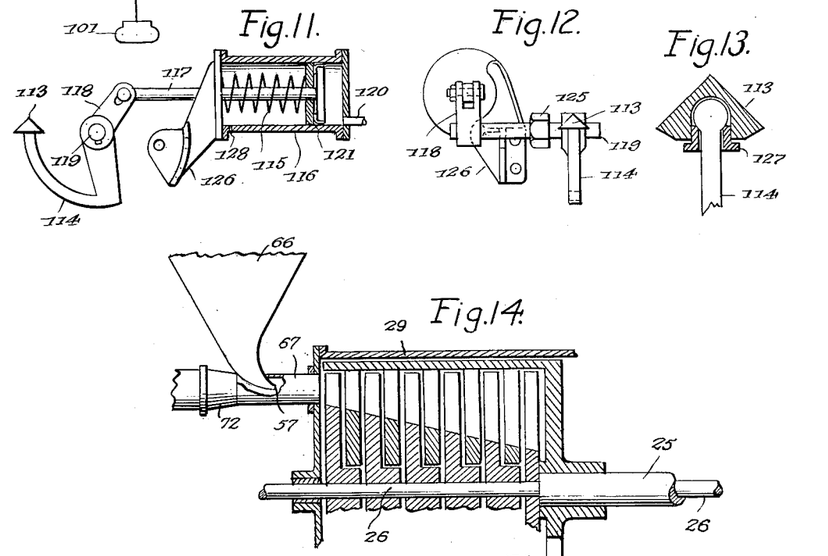
Figure 11 is a detail sectional view of the cooling jet valve and its operating cylinder as in Figure 5.
Figure 12 is an end elevation of the cylinder and valve of Figure 11.
Figure 13 is a detail section of the latter valve per se.
Figure 14 shows an adaptation of the cooling system to an axial flow turbine in longitudinal section.

In Figures 5, 11, 12 and 13, a modified form of cooling jet nozzle valve is shown. Here, a valve 113 is carried on an arm 114 and is held firmly on a valve seat 93 (Figure 5) by the tension of a spring 115 disposed within a cylinder 116. The tension of this spring 115 is transferred through a piston rod 117, an arm 118, and a shaft 119 to the arm 114 and holds the valve 113 on its seat to prevent any escape of the cooling liquid from the tank 66 when the turbine is not running. When the turbine is started and gas pressure is built up in the pipe line 73, due to the action of the slow leak-return check valve 75 as previously explained, a portion of this pressure passes from pipe 73 and enters a pipe 120 and acts upon a piston 121 to force it to the left within the cylinder 116; the motion of the piston being transferred through piston rod 117, the arm 118, and the shaft 119 and from the latter by way of the arm 114 to the valve 113. This action leaves the cooling jet 57, Figure 5, wide open and it immediately begins to discharge water into the cooling jet nozzle 67 and hence into the blading 21, 22. The valve 113 is held open and at rest on another valve seat 123, when pressure in the line 120 and the cylinder 116 forces the piston 121 to the left, and thus prevents water and the gases of combustion from entering a casing 124 which encloses the valve arm 114. A packing nut 125, Figure 12, is a further aid to prevent leakage about the shaft 119 where it emerges from the casing 124. A suitable bracket 126 supports the cylinder 116 on the casing 124 or on the cooling jet nozzle 67, Figure 5. The valve 113 is secured to the arm 114 by a bushing 127 (Fig. 13) and is fitted sufficiently loose on the arm to seat properly on both seats 93, 123. As long as the turbine operates, the pressure in the cylinder 116 overcomes the spring 115 and holds the valve 113 on its lower seat 123, but, when the turbine is stopped and the pressure leaks off through the check valve 75, the action of the spring 115 forces the valve 113 back on seat 93. A vent 128 prevents back pressure on the piston 121.

The cooling, thus obtained, is continuous in proportion to the load on the turbine, because the pressure in the cooling tank 66 changes with the turbine load. The pressure in tank 66 quite closely follows the pressure in the power nozzles 63, 68, due to the action of the slow leakage return check valve 75. The cooling arrangement just described can be applied to any turbine wherein sufficient space can be had between the power nozzles 68 for the cooling jet 57, or a cooling jet nozzle 67.

The axial flow turbine, Figure 14, which may be either horizontally or vertically disposed, may be readily equipped with my cooling system. Also, turbines wherein the gases pass through blading in irregular courses, as well as those which operate on radial flow, either outwardly from the center or inwardly from the circumference.

Figure 15:
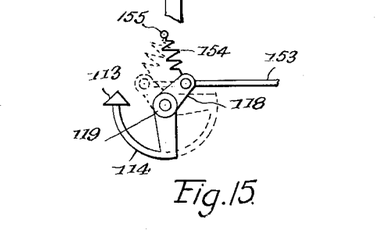
Figure 15 is a side elevation of the cooling jet valve as shown in Figures 2, 3, and 4, and showing a manually operated means therefor.

As shown in Figure 15, the cooling liquid control valve 113 may be manually operated through the medium of a rod 153. When the rod is moved to the right, valve 113 closes the cooling jet 57, Figure 5, and when it is moved to the left the jet is opened and the valve seats on the lower valve seat 123. A compression spring 154 is so compressed between a fixed pin 155 and a valve actuating arm 118 that it holds the valve firmly on either of the seats 93 or 123.

Without further description, it is thought that the features and advantages of the invention will be readily apparent to those skilled in the art, and it will of course be understood that changes in form, proportion and minor details of construction and arrangement may be resorted to without departing from the spirit of the invention or its scope as claimed.

Having thus fully described my invention, what I claim is:

1. In a turbine having opposite directional rotating blading operated by the impingement on said blading of products of combustion under pressure and at temperatures which, in the absence of cooling, are harmful to said blading, means injecting cooling water through said blading along a path which is non-coextensive with the path of combustion gases through said blading, said injecting means including a nozzle and a control valve therefor normally closed, and means for automatically opening said valve in response to pressure of the products of combustion when the turbine is in operation.

2. In a turbine operated by the products of combustion under pressure and having opposite directional rotating blading, means continuously injecting cooling water through said blading along a path which is non-coextensive with the path of combustion gases through said blading, dissipation of heat from the combustion gases to the cooling water being thereby prevented prior to their reaction on the blading, said paths being directed in a similar manner through said blading so that the cooling water will strike the hottest portion of the blading first.

3. In a turbine operated by the products of combustion under pressure and having opposite directional rotating blading, means intermittently injecting cooling water through said blading along a path which is non-coextensive with the path of combustion gases through said blading dissipation of heat from the combustion gases to the cooling water being thereby prevented prior to their reaction on the blading said paths being directed in a similar manner through said blading so that the cooling water will strike the hottest portion of the blading first.

4. Means for cooling the opposite directional rotating blading of an explosive turbine comprising means for injecting cooling water through said blading along a path adjacent to but non-coextensive with the path of combustion gases through said blading, dissipation of heat from the combustion gases to the cooling water being thereby prevented prior to their reaction on the blading, means utilizing a portion of said combustion gases to forcibly eject said cooling water from said injecting means said injecting means including a nozzle and a control valve therefor normally closed, and means for automatically opening said valve in response to pressure of the products of combustion when the turbine is in operation.

5. Means for cooling the opposite directional rotating blading of an explosive turbine, comprising means for injecting cooling water through said blading along a path adjacent to but non-coextensive with the path of combustion gases through said blading, dissipation of heat from the combustion gases to the cooling water being thereby prevented prior to their reaction on the blading means regulating the rate of flow of said cooling water from said injection means in accordance with the load on said turbine said injecting means including a nozzle and a control valve therefor normally closed, and means for automatically opening said valve in response to pressure of the products of combustion when the turbine is in operation.

6. Means for cooling the opposite directional rotating blading of an explosive turbine, comprising means for injecting cooling water through said blading along a path adjacent to but non-coextensive with the path of combustion gases through said blading, dissipation of heat from the combustion gases to the cooling water being thereby prevented prior to their reaction on the blading said paths being directed in a similar manner through said blading so that the cooling water will strike the hottest portion of the blading first, and means supplying pressure to said cooling water passing through said injecting means in proportion to the load on said turbine.

7. Means for cooling the opposite directional rotating blading of an explosive turbine having an explosion chamber, comprising means for injecting cooling water through said blading along a path adjacent to but non-coextensive with the path of combustion gases through said blading, dissipation of heat from the combustion gases to the cooling water being thereby prevented prior to their reaction on the blading, said paths being directed in a similar manner through said blading so that the cooling water will strike the hottest portion of the blading first and means supplying pressure to said cooling water passing through said injecting means, intermittently and in timed relation to the explosions occurring in said explosion chamber.

8. Means for cooling the opposite directional rotating blading of an explosion turbine, comprising means for injecting cooling water through said blading along a path adjacent to but non-coextensive with the path of combustion gases through said blading, dissipation of heat from the combustion gases to the cooling water being thereby prevented prior to their reaction on the blading said paths being directed in a similar manner through said blading so that the cooling water will strike the hottest portion of the blading first, and means supplying pressure to said cooling water passing through said injecting means in proportion to the speed of said turbine.

9. In combination, a turbine operated by the products of combustion under pressure and having oppositely rotating blading and a cooling means therefor, said cooling means comprising means for injecting cooling water through said blading along a path adjacent to but substantially non-coextensive with the path of combustion gases through said blading, dissipation of heat from the combustion gases to the cooling water being thereby prevented prior to their reaction on the blading said injecting means including a nozzle, a control valve which is normally held closed by resilient means, pneumatic means for opening said valve in response to pressure of the products of combustion when the turbine is in operation.

10. Means for cooling the opposite directional rotating blading of an explosive turbine, comprising a tank for the storage of cooling water, a jet for injecting said cooling water through said blading along a path adjacent to but non-coextensive with the path of combustion gases through said blading, dissipation of heat from the combustion gases to the cooling water being thereby prevented prior to their reaction on the blading and means supplying pressure to said tank for forcibly ejecting said cooling water from said jet.

11. Means for cooling the opposite directional rotating blading of an explosive turbine having a combustion chamber, said means comprising a tank for the storage of cooling water, a jet for injecting said cooling water through said blading along a path adjacent to but non-coextensive with the path of combustion gases through said blading, dissipation of heat from the combustion gases to the cooling water being thereby prevented prior to their reaction on the blading and means for supplying a portion of said combustion gases to said tank for the forceful ejection of said cooling water from said jet.

12. Means for cooling the opposite directional rotating blading of an explosive turbine having an intermittently fired combustion chamber, said means comprising a tank for the storage of cooling water, a jet for injecting said cooling water through said blading along a path adjacent to but non-coextensive with the path of combustion gases through said turbine, means for supplying a portion of said combustion gases to said tank for the forceful ejection of said cooling water from said jet, and means retaining a sufficient amount of said gases in said tank to provide a substantially uniform pressure therein while said turbine is in operation.

13. Means for cooling the opposite directional rotating blading of an explosive turbine having an intermittently fired combustion chamber, said means comprising a tank for the storage of cooling water, a jet for injecting said cooling water through said blading along a path adjacent to but non-coextensive with the path of combustion gases through said blading, means for supplying a portion of said combustion gases from said combustion chamber to said tank for the forceful ejection of said cooling water from said jet, and a check valve having a vent therein of such size that sufficient amount of said gases will be retained in said tank while said turbine is in operation to provide a substantially uniform pressure therein, but allowing the dissipation of said gases from said tank upon cessation of the operation of said turbine.

14. Means for cooling the opposite directional rotating blading of an explosive turbine, comprising means for injecting cooling water through said blading along a path adjacent to but non-coextensive with the path of combustion gases through said blading, dissipation of heat from the combustion gases to the cooling water being thereby prevented prior to their reaction on the blading said paths being directed in a similar manner through said blading so that the cooling water will strike the hottest portion of the blading first and means regulating the pressure of said cooling water entering said blading to pressures greater than the entering pressure of said combustion gases.

15. Means for cooling the opposite directional rotating blading of an explosive turbine, comprising a tank for the storage of cooling water, a jet for injecting said cooling water through said blading said jet having means to adjust the opening thereof, means supplying said tank with a portion of said combustion gases at substantially their entering pressure for the forceful ejection of said cooling water from said jet, said adjusting means utilizing a portion of said combustion gases to regulate the size of the opening of said jet.

16. Means for cooling the opposite directional rotating blading of an explosive turbine, comprising a source of cooling water under pressure, an adjustable jet for injecting said cooling water through said blading said jet having means to adjust the opening thereof, said adjusting means utilizing a portion of the combustion gases of said turbine to regulate the amount of opening of said jet in proportion to the pressure of said gases as they enter said blading.

17. Means for cooling the opposite directional rotating blading of an explosive turbine, comprising a source of cooling water under pressure, a jet for injecting said cooling water through said blading, and means utilizing a portion of the combustion gases of said turbine to increase the velocity of said water after it leaves said jet in proportion to the pressure of said gases as they enter said blading.

18. Means for cooling the opposite directional rotating blading of an explosive turbine comprising a source of cooling water under pressure, a jet for injecting said cooling water through said blading, means normally maintaining said jet closed, and means utilizing a portion of the combustion gases of said turbine to open said jet upon the starting of said turbine and to maintain said jet open as long as said turbine continues to operate.

19. Means for cooling the opposite directional rotating blading of an explosive turbine, comprising a source of cooling water under pressure, a jet for injecting said cooling water through said blading, a valve closing said jet against the pressure of said source, a flapper so connected to said valve as to open it an amount proportional to movement of said flapper, and means bleeding off a portion of the combustion gases of said turbine and directing them against said flapper and around the cooling water leaving said jet, whereby velocity of cooling water leaving said jet will vary in proportion to the pressure of said combustion gases.

20. A turbine having oppositely rotating blading, a combustion gas jet for supplying the operating fluid thereto and a cooling-water jet spaced circumferentially from said gas jet but directed similarly thereto, for supplying the cooling water to the blading dissipation of heat from the combustion gases to the cooling water being thereby prevented prior to their reaction on the blading.

21. A turbine having oppositely rotating blading, a combustion chamber for furnishing products of combustion, a combustion gas jet for supplying said products of combustion as the operating fluid to said blading, a cooling-water jet spaced circumferentially from said gas jet but directed similarly thereto for supplying the cooling water to the blading, and a gas conduit supplying a portion of the products of combustion from the combustion chamber to the said cooling-water jet for speeding up the water jet to a speed comparative to that of the operating fluid.

22. A turbine having oppositely rotating blading, a combustion chamber for furnishing products of combustion, a combustion gas jet for supplying said products of combustion as the operating fluid to said blading, a cooling-water jet spaced circumferentially from said gas jet but directed similarly thereto for supplying the cooling water to the blading, a gas conduit supplying a portion of the products of combustion from the combustion chamber to the cooling water jet for speeding up the water jet to a speed comparative to that of the operating fluid, and cooling means for said conduit.

23. A turbine having oppositely rotating blading, a combustion chamber for furnishing products of combustion, a combustion gas jet for supplying said products of combustion as the operating fluid to said blading, a cooling-water jet spaced circumferentially from said gas jet but directed similarly thereto for supplying the cooling water to the blading, a gas conduit supplying a portion of the products of combustion from the combustion gas jet to the cooling-water jet for speeding up the water jet to a speed comparative to that of the operating fluid, cooling means for said conduit, a water reservoir and a connection between said conduit and said reservoir to supply pressure thereto in accordance with the combustion chamber pressure.

24. A turbine having oppositely rotating blading, a combustion chamber for furnishing products of combustion, a combustion gas jet for supplying said products of combustion as the operating fluid to said blading, a cooling-water jet spaced circumferentially from said gas jet but directed similarly thereto for supplying the cooling water to the blading, a gas conduit supplying a portion of the products of combustion from the combustion chambers to the cooling water jet for speeding up the water jet to a speed comparative to that of the operating fluid, cooling means for said conduit, a water reservoir, a connection between said conduit and said reservoir to supply pressure thereto and a slow-leak check valve in said connection.

25. A turbine having oppositely rotating blading, a combustion chamber for furnishing products of combustion, a combustion gas jet for supplying said products of combustion as the operating fluid to said blading, a cooling water jet including a water nozzle spaced circumferentially from said gas jet but directed similarly thereto for supplying the cooling water to the blading, a gas conduit supplying a portion of the products of combustion from the combustion chamber to the cooling water jet for speeding up the water jet to a speed comparative to that of the operating fluid, cooling means for said conduit, a water reservoir, a connection between said conduit and said reservoir to supply pressure thereto, a slow-leak check valve in said connection, a valve for said nozzle normally held resiliently closed and pneumatic means for opening said valve in response to the pressure of the combustion gas.

26. A turbine having oppositely rotating alternate blading, a combustion chamber intermittently furnishing products of combustion, a combustion gas jet for supplying said products as the operating fluid to said blading, a cooling-water jet spaced circumferentially from said gas jet but directed similarly thereto for supplying the cooling water to the blading at a speed comparative to that of said operating fluid, a pneumatically-operated water pump connected to supply water to said water jet and a gas conduit between the combustion gas jet and said pump for supplying gases thereto for operating it in response to the pressure impulses of the combustion gas.

27. A turbine having oppositely rotating alternate blading, a combustion chamber intermittently furnishing products of combustion, a combustion gas jet for supplying said products as the operating fluid to said blading, a cooling-water jet including a nozzle spaced circumferentially from said gas jet but directed similarly thereto for supplying the cooling water to the blading, a gas conduit supplying a portion of said products of combustion from the combustion gas jet to said cooling water jet for speeding up the water jet to a speed comparative to that of the operating fluid, a water reservoir, a connection between said conduit and said reservoir to supply pressure thereto in accordance with the combustion gas pressure, a slow-leak check valve in said connection, a valve for said water nozzle normally held resiliently closed and means for opening said valve in response to the pressure impulses of the combustion gases.

28. A turbine having oppositely rotating alternate blading, a combustion chamber intermittently furnishing products of combustion, a combustion gas jet for supplying said products of combustion as the operating fluid to said blading, a cooling water jet spaced circumferentially from said gas jet but directed similarly thereto for supplying the cooling water to the blading at a speed comparative to that of said operating fluid, a pneumatically-operated water pump connected to supply water to said water jet, a gas conduit between the combustion gas jet and said pump for supplying gases thereto for operating it in response to the pressure impulses of the combustion gas, and means for controlling the stroke of said pump.

29. A turbine having oppositely rotating alternate blading, a combustion chamber furnishing products of combustion, a combustion gas jet for supplying said products of combustion as the operating fluid to said blading, a cooling water jet spaced circumferentially from said gas jet but directed similarly thereto for supplying the cooling water to the blading, dissipation of heat from the products of combustion to the cooling water being thereby prevented prior to their reaction on the blading, a turbine-operated water pump for supplying water to said water jet.

30. A turbine having oppositely rotating alternate blading, a combustion chamber intermittently furnishing products of combustion, a combustion gas jet for supplying said products of combustion as the operating fluid to said blading, a cooling water jet spaced circumferentially from said gas jet but directed similarly thereto for supplying the cooling fluid to the blading, a gas conduit supplying a portion of the products of combustion from the combustion gas jet to said cooling water jet for speeding up the water jet to a speed comparative to that of the operating fluid, a water reservoir, a connection between said conduit and said reservoir to supply pressure thereto in accordance with the combustion gas pressure, a slow-leak check valve in said connection, a jacket around said water reservoir, means for supplying the exhaust gases from the turbine to said jacket and means for regulating said supply.

GEORGE H. WAKEFIELD.